United States Patent
Shimizu et al.

(10) Patent No.: US 7,563,854 B2
(45) Date of Patent: Jul. 21, 2009

(54) METHOD OF PRODUCING HIGH MOLECULAR WEIGHT ORGANOPOLYSILOXANE, COMPOSITION COMPRISING THE HIGH MOLECULAR WEIGHT ORGANOPOLYSILOXANE, AND OPTICAL SEMICONDUCTOR DEVICE SEALED WITH CURED PRODUCT THEREOF

(75) Inventors: Hisashi Shimizu, Annaka (JP); Toshio Shiobara, Annaka (JP); Tsutomu Kashiwagi, Annaka (JP)

(73) Assignee: Shin-Estu Chemical Co., Ltd., Tokyo (JP)

( * ) Notice: Subject to any disclaimer, the term of this patent is extended or adjusted under 35 U.S.C. 154(b) by 383 days.

(21) Appl. No.: 11/586,525

(22) Filed: Oct. 26, 2006

(65) Prior Publication Data

US 2007/0099008 A1    May 3, 2007

(30) Foreign Application Priority Data

Oct. 27, 2005    (JP)    ............................. 2005-312503

(51) Int. Cl.
*C08G 77/06*    (2006.01)
(52) U.S. Cl. .............................. 528/10; 528/12; 528/21
(58) Field of Classification Search ........................ None
See application file for complete search history.

(56) References Cited

U.S. PATENT DOCUMENTS

| 2,389,477 | A | * | 11/1945 | Wright ........................ 528/15 |
| 5,359,022 | A | | 10/1994 | Mautner et al. |
| 5,516,858 | A | * | 5/1996 | Morita et al. ............... 525/478 |
| 5,548,053 | A | | 8/1996 | Weidner et al. |
| 6,069,220 | A | * | 5/2000 | Hoffmann et al. ............. 528/12 |
| 2003/0212228 | A1 | * | 11/2003 | Dai et al. ..................... 528/10 |

FOREIGN PATENT DOCUMENTS

| EP | 0 089 279 A1 | 9/1983 |
| EP | 1 559 760 A2 | 8/2005 |

* cited by examiner

*Primary Examiner*—Marc S Zimmer
(74) *Attorney, Agent, or Firm*—Oblon, Spivak, McClelland, Maier & Neustadt, P.C.

(57) ABSTRACT

Provided is a method of producing a high molecular weight organopolysiloxane with a polystyrene equivalent weight average molecular weight of at least $5 \times 10^4$, comprising the steps of producing an organopolysiloxane by subjecting a silane compound having a hydrolyzable group to a first hydrolysis and condensation, and then subjecting that organopolysiloxane to an additional second hydrolysis and condensation. The high molecular weight organopolysiloxane is stable, resistant to gelling, and resistant to cracking even when formed as a thick film. A resin composition comprising the high molecular weight organopolysiloxane and a condensation catalyst is useful for sealing an optical element and for producing an optical semiconductor device.

9 Claims, No Drawings

METHOD OF PRODUCING HIGH MOLECULAR WEIGHT ORGANOPOLYSILOXANE, COMPOSITION COMPRISING THE HIGH MOLECULAR WEIGHT ORGANOPOLYSILOXANE, AND OPTICAL SEMICONDUCTOR DEVICE SEALED WITH CURED PRODUCT THEREOF

BACKGROUND OF THE INVENTION

1. Field of the Invention

The present invention relates to a method of producing a high molecular weight organopolysiloxane by conducting the hydrolysis and condensation reaction of a silane compound containing a hydrolyzable group such as an organoalkoxysilane as a two-stage hydrolysis and condensation reaction, and also relates to a composition comprising a high molecular weight organopolysiloxane produced using such a method, and an optical semiconductor device comprising an optical semiconductor element sealed with a cured product of such a composition.

2. Description of the Prior Art

Methods of producing organopolysiloxanes by hydrolysis and condensation of organoalkoxysilanes are widely used in the silicone manufacturing industry. The most commonly used method for conducting hydrolysis of an organoalkoxysilane involves conducting a hydrolysis and condensation reaction using an acid catalyst such as acetic acid, hydrochloric acid, or sulfuric acid.

However, in systems that contain a large quantity of an organoalkoxysilane containing 3 or more hydrolyzable groups such as methyltrimethoxysilane, which readily undergoes condensation and gelling, if hydrolysis is conducted using an acid catalyst such as acetic acid, hydrochloric acid, or sulfuric acid, then the resulting high molecular weight organopolysiloxane polymer is unstable and is prone to immediate gelling.

Furthermore, coatings obtained by curing compositions comprising conventional organopolysiloxanes produced by hydrolysis-condensation of organotrialkoxysilanes have a high degree of hardness, and are consequently used for protecting plastic surfaces such as the plastic lenses used within spectacles and sunroofs within vehicles. However, these coatings typically have a thickness of 2 to 3 μm, and if the thickness is 10 μm or greater, then cracking becomes a problem. Furthermore, because these coatings exhibit excellent mechanical properties, heat resistance, and electrical insulating properties, they are also used as protective films and materials for interlayer insulation layers for electrical components and semiconductors, and also as photosensitive materials, pellicle materials and coating materials, but they are not used as hard thick films.

However, a coating produced by curing a composition comprising an organopolysiloxane produced by hydrolysis and condensation of a silane compound containing an organotrialkoxysilane as the primary component is hard, exhibits a high degree of thermal stability, and is a potential substitute material for glass, and consequently the development of a method of producing a high molecular weight organopolysiloxane capable of resolving the above problems has been keenly sought.

SUMMARY OF THE INVENTION

The present invention takes the above circumstances into consideration, and relates to a method of producing a high molecular weight organopolysiloxane that is stable, resistant to gelling, and resistant to cracking even when formed as a thick film. Specifically, the present invention relates to a method of producing a high molecular weight organopolysiloxane by conducting a two-stage hydrolysis and condensation reaction of a silane compound containing a hydrolyzable group, such as an organoalkoxysilane, as well as a composition comprising a high molecular weight organopolysiloxane produced using such a method, and an optical semiconductor device comprising an optical semiconductor element sealed with a cured product of such a composition.

As a result of intensive research aimed at resolving the above problems, the inventors of the present invention were able to complete the present invention. In other words, a first aspect of the present invention provides:

a method of producing a high molecular weight organopolysiloxane with a polystyrene equivalent weight average molecular weight of at least $5 \times 10^4$, represented by an average composition formula (1) shown below:

$$R^1_a(OX)_b SiO_{(4-a-b)/2} \tag{1}$$

(wherein, each $R^1$ represents, independently, an alkyl group, alkenyl group or aryl group of 1 to 6 carbon atoms, each X represents, independently, a hydrogen atom, or an alkyl group, alkenyl group, alkoxyalkyl group or acyl group of 1 to 6 carbon atoms, a represents a number within a range from 1.00 to 1.5, and b represents a number that satisfies $0<b<2$, provided that a+b satisfies $1.00<a+b<2$), comprising the steps of producing an organopolysiloxane by subjecting a silane compound having a hydrolyzable group to a first hydrolysis and condensation, and then subjecting the organopolysiloxane to an additional second hydrolysis and condensation.

A second aspect of the present invention provides a curable resin composition comprising a high molecular weight organopolysiloxane produced by the above production method, and a condensation catalyst.

A third aspect of the present invention provides a cured product obtained by curing the above composition.

A fourth aspect of the present invention provides a sealing material comprising the above composition.

A fifth aspect of the present invention provides a method for sealing an optical element with a cured product of the above sealing material, comprising the steps of:

applying said sealing material to said optical element and curing said sealing material to form said cured product on said optical element.

A sixth aspect of the present invention provides an optical semiconductor device, comprising an optical semiconductor element, and a cured product of the above curable resin composition that seals the optical semiconductor element.

By employing the production method of the present invention a high molecular weight organopolysiloxane that is stable, resistant to gelling, and has a polystyrene equivalent weight average molecular weight of at least $5 \times 10^4$ can be produced. A high molecular weight organopolysiloxane produced in this manner can be used to produce a composition by mixing with a condensation catalyst. This composition is not only resistant to cracking (namely, exhibits excellent crack resistance) even when formed as a thick film (for example, a thick film of 50 μm or greater), but is also useful in producing a cured product with excellent levels of adhesion, heat resistance, transparency, hardness, and flexibility. Accordingly, this composition is particularly ideal for sealing optical elements such as optical semiconductor elements, and can be used in the production of optical semiconductor devices.

DETAILED DESCRIPTION OF THE PREFERRED EMBODIMENTS

As follows is a more detailed description of the present invention. In this description, "room temperature" is defined as 24±2° C. Furthermore, the term "polystyrene equivalent weight average molecular weight" refers to the weight average molecular weight from a molecular weight distribution obtained by gel permeation chromatography analysis, and in those cases where this molecular weight distribution exhibits a distribution profile with 2 or more peaks, refers to the weight average value for the peak within the profile that occurs at the highest molecular weight.

<High Molecular Weight Organopolysiloxane>

A high molecular weight organopolysiloxane produced by a production method of the present invention is represented by the above average composition formula (1), and has a polystyrene equivalent weight average molecular weight of at least $5\times10^4$, and typically within a range from of at least $1\times10^5$ to $6\times10^5$, and even more typically within a range from $2\times10^5$ to $5\times10^5$. If the weight average molecular weight is less than $5\times10^4$, then when the high molecular weight organopolysiloxane is mixed with a condensation catalyst described below and used to prepare a coating, the coating is more prone to cracking, and a coating with a thickness of 50 μm or greater may be unobtainable.

In the above average composition formula (1), the alkyl groups, alkenyl groups and aryl groups represented by $R^1$ contain from 1 to 6 carbon atoms. Examples of suitable alkyl groups include a methyl group, ethyl group, propyl group, isopropyl group, butyl group, or isobutyl group. Examples of suitable alkenyl groups include an allyl group or vinyl group. An example of a suitable aryl group is a phenyl group. A methyl group is particularly preferred as the $R^1$ group.

In the average composition formula (1), the alkyl groups, alkenyl groups, alkoxyalkyl groups and acyl groups resented by X contain from 1 to 6 carbon atoms. Examples of suitable alkyl groups include a methyl group, ethyl group, propyl group, isopropyl group, butyl group, or isobutyl group. Examples of suitable alkenyl groups include an allyl group or vinyl group. Examples of suitable alkoxyalkyl groups include a methoxyethyl group, ethoxyethyl group or butoxyethyl group. Examples of suitable acyl groups include an acetyl group or propionyl group. A hydrogen atom, a methyl group or an isobutyl group is particularly preferred as the group X.

In the above average composition formula (1), a is a number within a range from 1.00 to 1.5, and preferably from 1.05 to 1.3, and even more preferably from 1.1 to 1.2, and b is a number that satisfies 0<b<2, and is preferably a number within a range from 0.01 to 1.0, and even more preferably from 0.05 to 0.3. If the value of a is less than 1.00, then the obtained coating may be more prone to cracking. If the value of a exceeds 1.5, then the obtained coating may lose toughness, and may be more prone to becoming brittle. If b is zero, then the adhesion of the obtained coating to substrates may deteriorate. If b is 2 or greater, then a cured coating may be unobtainable. Furthermore, the value of a+b is a number that satisfies 1.00<a+b<2, and is preferably a number within a range from 1.00 to 1.5, and even more preferably from 1.1 to 1.3.

In a high molecular weight organopolysiloxane produced by the production method of the present invention, the (mass referenced) proportion of the $R^1$ groups such as methyl groups is preferably reduced. The reason for this preference is that when a composition is prepared by mixing the organopolysiloxane with a condensation catalyst described below, the heat resistance of the cured product produced by curing the composition is superior. Specifically, the above proportion is normally 29% by mass or lower, and typically within a range from 15 to 29% by mass, and even more typically from 20 to 27% by mass.

-Production Method-

The high molecular weight organopolysiloxane described above is produced using a method that comprises:
(i) obtaining an organopolysiloxane by subjecting a silane compound having a hydrolyzable group to a first hydrolysis and condensation (step (i)), and
(ii) subjecting the organopolysiloxane to an additional second hydrolysis and condensation (step (ii)).

Step (i)

The aforementioned silane compound having a hydrolyzable group that is used as a starting raw material in the step (i) is a silane compound (c=1 to 3), a silicate (c=0), or a condensation polymerization product of a silicate (that is, a polysilicate) (hereafter the term "(poly)silicate" is used to refer jointly to silicate and polysilicate), as represented by a general formula (2) shown below:

$$SiR^2_c(OR^3)_{4-c} \qquad (2)$$

(wherein, each $R^2$ represents, independently, a group as defined above for $R^1$, each $R^3$ represents, independently, a group as defined above for X with the exception of a hydrogen atom, and c represents an integer of 0 to 3). The silane compound having a hydrolyzable group is preferably either solely a silane compound represented by the above general formula (2), or a combination of a silane compound represented by the above general formula (2) and an aforementioned (poly)silicate. These silane compounds and (poly)silicates represented by the above general formula (2) may be used either alone, or in combinations of two or more different compounds.

Examples of the silane compound represented by the above general formula (2) include organotrialkoxysilanes such as methyltrimethoxysilane, methyltriethoxysilane, ethyltrimethoxysilane, ethyltriethoxysilane, phenyltrimethoxysilane, and phenyltriethoxysilane; and diorganodialkoxysilanes such as dimethyldimethoxysilane, dimethyldiethoxysilane, diphenyldimethoxysilane, diphenyldiethoxysilane, methylphenyldimethoxysilane and methylphenyldiethoxysilane. Of these, methyltrimethoxysilane and dimethyldimethoxysilane are preferred.

Examples of the silicates represented by the above general formula (2) include tetraalkoxysilanes (namely, alkyl silicates) such as tetramethoxysilane, tetraethoxysilane and tetraisopropyloxysilane, and tetramethoxysilane and tetraethoxysilane are preferred. Examples of the aforementioned polysilicates include condensation polymerization products of alkyl silicates (alkyl polysilicates), and specific examples include methyl polysilicate and ethyl polysilicate.

The aforementioned silane compound having a hydrolyzable group preferably comprises a total of at least 50 mol %, and preferably from 70 to 95 mol %, and even more preferably from 75 to 85 mol %, of silane compounds containing 3 hydrolyzable groups within each molecule (namely, silane compounds of the above general formula (2) wherein c=1). Specific examples of silane compounds containing 3 hydrolyzable groups within each molecule include organotrihydrocarbyloxysilanes such as the organotrialkoxysilanes described above. The silane compound containing 3 hydrolyzable groups within each molecule is preferably an organotrialkoxysilane.

Of these possibilities, the above high molecular weight organopolysiloxane is preferably produced using a silane compound having a hydrolyzable group that comprises from 50 to 100 mol % of an organotrialkoxysilane such as methyltrimethoxysilane, and from 50 to 0 mol % of a diorganodialkoxysilane such as dimethyldimethoxysilane, and even more preferably comprises from 75 to 85 mol % of an organotrialkoxysilane such as methyltrimethoxysilane, and from 25 to 15 mol % of a diorganodialkoxysilane such as dimethyldimethoxysilane, as such high molecular weight organopolysiloxanes provide superior levels of crack resistance and heat resistance in the resulting cured product.

The hydrolysis and condensation of the silane compound having a hydrolyzable group can be conducted using typical methods, but is preferably conducted in the presence of an acid catalyst such as acetic acid, hydrochloric acid or sulfuric acid or a combination thereof. In those cases where an acid catalyst is used, the quantity of that acid catalyst is typically set so as to provide from 0.0001 to 0.01 mols, and preferably from approximately 0.0005 to 0.005 mols of acid per 1 mol of the combined total of hydrolyzable groups within the silane compound having a hydrolyzable group. Provided this quantity satisfies the above range, a hydrolysis-condensation product with a suitable target molecular weight can be obtained.

The quantity of water added during the hydrolysis and condensation of the step (i) is typically within a range from 0.9 to 1.5 mols, and preferably from 1.0 to 1.2 mols, per 1 mol of the combined total of hydrolyzable groups (typically hydrocarbyloxy groups such as alkoxy groups) within the silane compound having a hydrolyzable group. When this quantity satisfies this range from 0.9 to 1.5 mols, the composition described below exhibits excellent workability, and the cured product of the composition exhibits excellent toughness.

The above silane compound having a hydrolyzable group is typically dissolved in an organic solvent such as an alcohol, ketone, ester, cellosolve or aromatic compound prior to use. Specifically, alcohols such as methanol, ethanol, isopropyl alcohol, isobutyl alcohol, n-butanol and 2-butanol are preferred. Of these, isobutyl alcohol is particularly preferred as it produces superior levels of curability for the obtained composition, and excellent toughness for the obtained cured product.

The reaction temperature for the hydrolysis and condensation of the step (i) is preferably within a range from 40 to 120° C., and even more preferably from 60 to 80° C. When the reaction temperature satisfies this range, a hydrolysis-condensation product with a molecular weight that is suitable for use within the following step can be obtained without gelling.

In this manner, a organopolysiloxane targeted by the step (i) is obtained. In those cases where an aforementioned organic solvent is used, this organopolysiloxane is obtained in the form of a solution. This organopolysiloxane may either be used in the step (ii) in solution form, or the solvent may be removed, and the resulting non-volatile fraction then used in the step (ii). Typically, when this organopolysiloxane is supplied to the step (ii), the volatile fraction comprising the solvent and the like is preferably at least 5% by mass, and is even more preferably within a range from 10 to 35% by mass. If the volatile fraction is less than 5% by mass, then the composition may become more prone to gelling, whereas if the volatile fraction exceeds 35% by mass, the reactivity may deteriorate. The polystyrene equivalent weight average molecular weight of the organopolysiloxane obtained in the step (i) is preferably within a range from $5\times10^3$ to $6\times10^4$, even more preferably from $1\times10^4$ to $5\times10^4$, and most preferably from $2\times10^4$ to $4\times10^4$. When this weight average molecular weight satisfies this range, the molecular weight of the organopolysiloxane is more readily increased in the step (ii), enabling the targeted organopolysiloxane with a suitable high molecular weight to be obtained.

Step (ii)

The step (ii) involves subjecting the aforementioned organopolysiloxane obtained in the step (i) to an additional second hydrolysis and condensation.

This second hydrolysis and condensation is preferably conducted in the presence of an anion exchange resin, which functions as a hydrolysis-condensation catalyst. A polystyrene-based anion exchange resin is preferred as this anion exchange resin. This anion exchange resin may be used either alone, or in combinations of two or more different resins. Examples of ideal polystyrene-based anion exchange resins include the Diaion products (manufactured by Mitsubishi Chemical Corporation). Specific examples of these products include the Diaion SA series (SA10A, SA11A, SA12A, NSA100, SA20A, and SA21A), the Diaion PA series (PA308, PA312, PA316, PA406, PA412, and PA418), the Diaion HPA series (HPA25), and the Diaion WA series (WA10, WA20, WA21J, and WA30).

Of the above anion exchange resins, moisture-containing polystyrene-based anion exchange resins having a molecular structure represented by a structural formula (3) shown below are preferred,

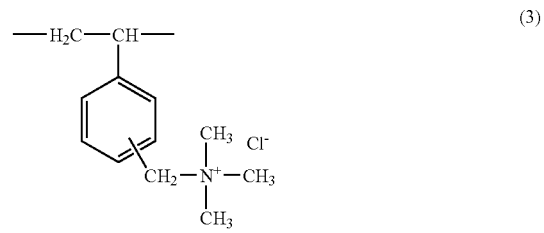

(3)

and polystyrene-based anion exchange resins that contain from 30 to 70% by mass, and particularly from 40 to 50% by mass of moisture within the resin are particularly preferred. Of the specific product examples listed above, SA10A is a polystyrene-based anion exchange resins that has a molecular structure represented by the above structural formula (3) and also contains 43 to 47% by mass of moisture within the resin, and is consequently particularly favorable. When an anion exchange resin such as a moisture-containing polystyrene-based anion exchange resin or the like is used, the action of the moisture within the catalyst causes the reaction to proceed. The most typical moisture-containing polystyrene-based anion exchange resins are gel-like ion exchange resins, in which the interior of the resin particles comprise uniform cross-linked polymers, and which have a transparent external appearance. Within the interior of the resin particles, the cross-linked polymers generate a uniform network-type structure, and water and the like can diffuse freely into the interior of the particles by passing through the gaps within this network structure. In those cases where a moisture-containing anion exchange resin is not used, water must be added separately. In such cases, water is preferably added in a quantity sufficient to generate a proportion of 30 to 70% by mass within the resin. In those cases where water is either absent or present in overly small quantities, the basicity of the anions weakens, which may cause a deterioration in the reactivity. By ensuring the presence of a suitable proportion of moisture as described above, the basicity strengthens, enabling the reaction to proceed favorably.

The quantity used of this anion exchange resin is typically within a range from 1 to 50% by mass, and preferably from 5 to 30% by mass, relative to the non-volatile fraction of the organopolysiloxane that represents the starting material for the step (ii). When the quantity satisfies this range, the reaction rate is favorable, and the resulting high molecular weight organopolysiloxane is more stable.

The reaction temperature for the hydrolysis and condensation of the step (ii) is preferably within a range from 0 to 40° C., and even more preferably from 15 to 30° C. When the reaction temperature satisfies this range, the reaction rate is favorable, and the resulting high molecular weight organopolysiloxane is more stable.

The hydrolysis and condensation of the step (ii) is preferably conducted within a solvent, and the reaction is preferably conducted under conditions in which the concentration of the organic solid components is within a range from 50 to 95% by mass, and even more preferably from 65 to 90% by mass. When this concentration satisfies the above range, the reaction rate is favorable, and the resulting high molecular weight organopolysiloxane is more stable.

There are no particular restrictions on the organic solvent used, although a solvent with a boiling point of at least 64° C. is preferred, and specific examples of suitable solvents include hydrocarbon-based solvents such as benzene, toluene, and xylene; ether-based solvents such as tetrahydrofuran, 1,4-dioxane, and diethyl ether; ketone-based solvents such as methyl ethyl ketone; halogen-based solvents such as chloroform, methylene chloride, and 1,2-dichloroethane; alcohol-based solvents such as methanol, ethanol, isopropyl alcohol, and isobutyl alcohol; octamethylcyclotetrasiloxane and hexamethyldisiloxane; as well as solvents with boiling points of 150° C. or higher such as cellosolve acetate, cyclohexanone, butyl cellosolve, methyl carbitol, carbitol, butyl carbitol, diethyl carbitol, cyclohexanol, diglyme, and triglyme; and of these, xylene, isobutyl alcohol, diglyme, and triglyme are preferred, and isobutyl alcohol is particularly desirable. The organic solvent may use either a single compound or a combination of two or more different compounds.

In this manner, a high molecular weight organopolysiloxane that is the target of the present invention, represented by the above average composition formula (1), and with a polystyrene equivalent weight average molecular weight of at least $5 \times 10^4$, and typically within a range from $1 \times 10^5$ to $6 \times 10^5$, and even more typically from $2 \times 10^5$ to $5 \times 10^5$, is obtained. In those cases where the hydrolysis and condensation of the step (ii) is conducted within a solvent, the high molecular weight organopolysiloxane is obtained in the form of a solution. The high molecular weight organopolysiloxane may either be stored and/or used in solution form, or the solvent may be removed by distillation, and the resulting non-volatile fraction then stored and/or used. In a state where the solvent has been removed, the high molecular weight organopolysiloxane exhibits a strong tendency to undergo gelling, and is therefore preferably stored in solution form from the viewpoint of storage stability, and is most preferably stored in solution form at a temperature of no higher than 5° C.

<Condensation Catalyst>

In those cases where the high molecular weight organopolysiloxane produced by the above production method is to undergo curing, the high molecular weight organopolysiloxane must be mixed with a condensation catalyst to prepare a composition. This condensation catalyst is preferably selected with due consideration of factors such as the stability of the above high molecular weight organopolysiloxane, as well as the hardness, resistance to yellowing, and curability of the coating that is formed. For example, organic acid zinc compounds, Lewis acid catalysts, organoaluminum compounds, and organotitanium compounds are ideal, and specific examples of suitable catalysts include zinc octoate, zinc benzoate, zinc p-tert-butylbenzoate, zinc laurate, zinc stearate, aluminum chloride, aluminum perchlorate, aluminum phosphate, aluminum triisopropoxide, aluminum acetylacetonate, aluminum butoxy-bis(ethylacetoacetate), tetrabutyl titanate, tetraisopropyl titanate, tin octoate, cobalt naphthenate, and tin naphthenate, and of these, zinc octoate is preferred.

The quantity added of the condensation catalyst is preferably within a range from 0.05 to 10 parts by mass, and even more preferably from 0.1 to 5 parts by mass, per 100 parts by mass of the high molecular weight organopolysiloxane. When the quantity added satisfies this range, the resulting composition exhibits favorable curability and is stable.

<Other Components>

In addition to the high molecular weight organopolysiloxane and the condensation catalyst described above, other optional components can also be added to a composition of the present invention, provided such addition does not impair the actions or effects of the present invention. Examples of these other optional components include inorganic fillers, inorganic phosphors, age resistors, radical inhibitors, ultraviolet absorbers, adhesion improvers, flame retardants, surfactants, storage stability improvers, antiozonants, photostabilizers, thickeners, plasticizers, coupling agents, antioxidants, thermal stabilizers, conductivity imparting agents, antistatic agents, radiation blockers, nucleating agents, phosphorus-based peroxide decomposition agents, lubricants, pigments, metal deactivators, physical property modifiers, and organic solvents. These optional components may be used either alone, or in combinations of two or more different materials.

Blending an inorganic filler into the composition can have a number of effects, including ensuring that the light scattering properties of the resulting cured product and the flowability of the composition fall within suitable ranges, and reinforcing the materials generated using the composition. There are no particular restrictions on the inorganic filler, although very fine particulate fillers that cause no deterioration in the optical characteristics are preferred, and suitable examples include alumina, aluminum hydroxide, fused silica, crystalline silica, ultra fine amorphous silica powder, ultra fine hydrophobic silica powder, talc, calcium carbonate, and barium sulfate.

Examples of suitable inorganic phosphors include the types of materials that are widely used in LEDs, such as yttrium aluminum garnet (YAG) phosphors, ZnS phosphors, $Y_2O_2S$ phosphors, red light emitting phosphors, blue light emitting phosphors, and green light emitting phosphors.

<Composition Preparation>

The composition can be prepared by mixing uniformly together the aforementioned high molecular weight organopolysiloxane and the condensation catalyst, together with any optional components that are to be added, using any arbitrary mixing method. In a specific example, these components are placed in a commercially available mixer (such as a Thinky Conditioning Mixer (manufactured by Thinky Corporation)) and mixed together uniformly for approximately 1 to 5 minutes, thereby yielding a composition. The high molecular weight organopolysiloxane and the condensation catalyst may each use either a single compound, or a combination of two or more different compounds.

A cured product can be prepared by curing the composition. This curing is preferably conducted by step curing within a range from room temperature to 200° C. In a specific example, the composition is preferably subjected to step curing at room temperature for 1 hour, and then at 60° C. for 30 minutes, 80° C. for 30 minutes, and then 150° C. for 8 hours. If the initial low temperature curing for 1 hour at room temperature is not conducted first within this step curing process, then the quantity of foam generated tends to increase. Following step curing, post curing may also be conducted if required. Post curing is typically conducted at 150 to 180° C. for approximately 4 to 10 hours, and is preferably conducted at 150° C. for 7 hours.

The cured product of the composition containing a high molecular weight organopolysiloxane produced by the production method of the present invention obtained in this manner exhibits excellent properties, including a high degree of hardness, favorable levels of flexibility, adhesion, heat resistance and transparency, and excellent resistance to cracking even when formed as a thick film (for example, a thick film of 50 μm or greater).

<Composition Applications>

A composition containing an aforementioned high molecular weight organopolysiloxane is particularly useful for sealing optical elements. Examples of the optical elements include optical semiconductor elements such as light emitting semiconductor elements and light receiving semiconductor elements. Accordingly, an optical semiconductor device can be prepared by sealing an optical semiconductor element with a cured product of the composition. Examples of applications include the sealing of LED elements, and especially the sealing of blue LED and ultraviolet LED elements. Because the composition also exhibits excellent levels of heat resistance, ultraviolet light resistance, and transparency, it can also be used in a variety of other applications described below, including display materials, optical recording materials, materials for optical equipment and optical components, fiber optic materials, photoelectronic organic materials, and peripheral materials for semiconductor integrated circuits.

-1. Display Materials-

Examples of display materials include peripheral materials for liquid crystal display devices, including films for use with liquid crystals such as substrate materials for liquid crystal displays, optical wave guides, prism sheets, deflection plates, retardation plates, viewing angle correction films, adhesives, and polarizer protection films; sealing materials, anti-reflective films, optical correction films, housing materials, front glass protective films, substitute materials for the front glass, and adhesives and the like for the new generation, flat panel, color plasma displays (PDP); substrate materials, optical wave guides, prism sheets, deflection plates, retardation plates, viewing angle correction films, adhesives, and polarizer protection films and the like for plasma addressed liquid crystal (PALC) displays; front glass protective films, substitute materials for the front glass, and adhesives and the like for organic EL (electroluminescence) displays; and various film substrates, front glass protective films, substitute materials for the front glass, and adhesives and the like for field emission displays (FED).

-2. Optical Recording Materials-

Examples of optical recording materials include disk substrate materials, pickup lenses, protective films, sealing materials, and adhesives and the like for use with VD (video disks), CD, CD-ROM, CD-R/CD-RW, DVD±R/DVD±RW/DVD-RAM, MO, MD, PD (phase change disk), and optical cards.

-3. Materials for Optical Equipment-

Examples of materials for optical instruments include lens materials, finder prisms, target prisms, finder covers, and light-receiving sensor portions and the like for steel cameras; lenses and finders for video cameras; projection lenses, protective films, sealing materials, and adhesives and the like for projection televisions; and lens materials, sealing materials, adhesives, and films and the like for optical sensing equipment.

-4. Materials for Optical Components-

Examples of materials for optical components include fiber materials, lenses, waveguides, element sealing agents and adhesives and the like around optical switches within optical transmission systems; fiber optic materials, ferrules, sealing agents and adhesives and the like around optical connectors; sealing agents and adhesives and the like for passive fiber optic components and optical circuit components such as lenses, waveguides and LED elements; and substrate materials, fiber materials, element sealing agents and adhesives and the like for optoelectronic integrated circuits (OEIC).

-5. Fiber Optic Materials-

Examples of fiber optic materials include illumination light guides for decorative displays; industrial sensors, displays and indicators; and fiber optics for transmission infrastructure or household digital equipment connections.

-6. Peripheral Materials for Semiconductor Integrated Circuits-

Examples of peripheral materials for semiconductor integrated circuits include resist materials for microlithography for generating LSI and ultra LSI materials.

-7. Photoelectronic Organic Materials-

Examples of photoelectronic organic materials include peripheral materials for organic EL elements and organic photorefractive elements; optical-optical conversion devices such as optical amplification elements, optical computing elements, and substrate materials around organic solar cells; fiber materials; and sealing agents and adhesives for the above types of elements.

<Optical Semiconductor Device>

An optical semiconductor device of the present invention comprises an optical semiconductor element, and a cured product of the above composition that seals the optical semiconductor element.

Examples of optical semiconductor elements that can be sealed with a cured product of the above composition include light emitting diodes, photodiodes, CCD, CMOS, image sensors, phototransistors, IR sensors, and laser diodes.

The thickness of the cured product of the composition used for sealing the above optical semiconductor element may be any thickness within a range from approximately 10 μm to 3 mm (3,000 μm), and thickness values within a range from approximately 50 μm to 1 mm (1,000 μm) are particularly favorable.

EXAMPLES

As follows is a more detailed description of the present invention using a series of examples, although the present invention is in no way limited by these examples. The methyltrimethoxysilane used in the synthesis examples is KBM13 (a product name) manufactured by Shin-Etsu Chemical Co., Ltd., and the dimethyldimethoxysilane is KBM22 (a product name), also manufactured by Shin-Etsu Chemical Co., Ltd.

Example 1

A 1 L three-neck flask was fitted with a stirrer and a condenser tube. The flask was then charged with 109 g (0.8 mols) of methyltrimethoxysilane, 24 g (0.2 mols) of dimethyldimethoxysilane, and 106 g of isobutyl alcohol, and the mixture was cooled in ice with constant stirring. With the temperature inside the system maintained at 0 to 20° C., 60.5 g of 0.05 N hydrochloric acid solution was added dropwise.

Following completion of the dropwise addition, the reaction mixture was stirred for 11 hours at a reflux temperature of 80° C. Subsequently, the resulting reaction solution was cooled to room temperature, and 150 g of xylene was added to dilute the reaction solution. This diluted reaction solution was then poured into a separating funnel, and washed repeatedly with 300 g samples of water until the electrical conductivity of the separated wash water fell to no more than 2.0 µS/cm. The water was then removed from the washed reaction solution by azeotropic dehydration, and the volatile fraction was adjusted to 30% by mass, thereby yielding 113 g of a solution (that included some organic solvent and had a non-volatile fraction of 70% by mass) of an organopolysiloxane A with a polystyrene equivalent weight average molecular weight of 24,000, represented by a formula (4) shown below:

$$(CH_3)_{1.2}(OX)_{0.25}SiO_{1.28} \tag{4}$$

(wherein, X represents a combination in which the ratio (molar ratio) hydrogen atoms:methyl groups:isobutyl groups=6.2:1.1:1.2).

Subsequently, the 113 g of the solution of the obtained organopolysiloxane A (that included some organic solvent and had a non-volatile fraction of 70% by mass) and 15.8 g of a polystyrene-based anion exchange resin (product name: Diaion SA10A, manufactured by Mitsubishi Chemical Corporation, moisture content: 43 to 47% by mass) were placed in a flask, and the resulting mixture was reacted by stirring for 72 hours at room temperature. Following completion of this 72 hour reaction, 27 g of xylene was added, and the mixture was filtered, yielding 135 g of a solution (that included some organic solvent and had a non-volatile fraction of 57% by mass) of an organopolysiloxane B with a polystyrene equivalent weight average molecular weight of 210,000, represented by a formula (5) shown below:

$$(CH_3)_{1.2}(OX)_{0.12}SiO_{1.34} \tag{5}$$

(wherein, X represents a combination in which the ratio (molar ratio) hydrogen atoms:methyl groups:isobutyl groups=5.1:1.0:1.0).

Example 2

A 1 L three-neck flask was fitted with a stirrer and a condenser tube. The flask was then charged with 68.1 g (0.5 mols) of methyltrimethoxysilane, 60.1 g (0.5 mols) of dimethyldimethoxysilane, and 118 g of isobutyl alcohol, and the mixture was cooled in ice with constant stirring. With the temperature inside system maintained at 0 to 20° C., 54 g of 0.05 N hydrochloric acid solution was added dropwise. Following completion of the dropwise addition, the reaction mixture was stirred for 11 hours at a reflux temperature of 80° C. Subsequently, the resulting reaction solution was cooled to room temperature, and 150 g of xylene was added to dilute the reaction solution. This diluted reaction solution was then poured into a separating funnel, and washed repeatedly with 300 g samples of water until the electrical conductivity of the separated wash water fell to no more than 2.0 µS/cm. The water was then removed from the washed reaction solution by azeotropic dehydration, and the volatile fraction was adjusted to 30% by mass, thereby yielding 109 g of a solution (that included some organic solvent and had a non-volatile fraction of 70% by mass) of an organopolysiloxane C with a polystyrene equivalent weight average molecular weight of 9,000, represented by a formula (6) shown below:

$$(CH_3)_{1.5}(OX)_{0.28}SiO_{1.11} \tag{6}$$

(wherein, X represents a combination in which the ratio (molar ratio) hydrogen atoms:methyl groups:isobutyl groups=6.3:1.3:1.2).

Subsequently, the 109 g of the solution of the obtained organopolysiloxane C (that included some organic solvent and had a non-volatile fraction of 70% by mass) and 15.2 g of a polystyrene-based anion exchange resin (product name: Diaion SA10A, manufactured by Mitsubishi Chemical Corporation, moisture content: 43 to 47% by mass) were placed in a flask, and the resulting mixture was reacted by stirring for 72 hours at room temperature. Following completion of this 72 hour reaction, 25 g of xylene was added, and the mixture was filtered, yielding 133 g of a solution (that included some organic solvent and had a non-volatile fraction of 57% by mass) of an organopolysiloxane D with a polystyrene equivalent weight average molecular weight of 80,000, represented by a formula (7) shown below:

$$(CH_3)_{1.5}(OX)_{0.21}SiO_{1.15} \tag{7}$$

(wherein, X represents a combination in which the ratio (molar ratio) hydrogen atoms:methyl groups:isobutyl groups=4.8:1.1:1.0).

Example 3

A 1 L three-neck flask was fitted with a stirrer and a condenser tube. The flask was then charged with 136.2 g (1.0 mols) of methyltrimethoxysilane and 106 g of isobutyl alcohol, and the mixture was cooled in ice with constant stirring. With the temperature inside system maintained at 0 to 20° C., 81 g of 0.05 N hydrochloric acid solution was added dropwise. Following completion of the dropwise addition, the reaction mixture was stirred for 11 hours at a reflux temperature of 80° C. Subsequently, the resulting reaction solution was cooled to room temperature, and 150 g of xylene was added to dilute the reaction solution. This diluted reaction solution was then poured into a separating funnel, and washed repeatedly with 300 g samples of water until the electrical conductivity of the separated wash water fell to no more than 2.0 µS/cm. The water was then removed from the washed reaction solution by azeotropic dehydration, and the volatile fraction was adjusted to 30% by mass, thereby yielding 105 g of a solution (that included some organic solvent and had a non-volatile fraction of 70% by mass) of an organopolysiloxane E with a polystyrene equivalent weight average molecular weight of 27,000, represented by a formula (8) shown below:

$$(CH_3)_{1.0}(OX)_{0.24}SiO_{1.38} \tag{8}$$

(wherein, X represents a combination in which the ratio (molar ratio) hydrogen atoms:methyl groups:isobutyl groups=6.5:1.2:1.2).

Subsequently, the 105 g of the solution of the obtained organopolysiloxane E (that included some organic solvent and had a non-volatile fraction of 70% by mass) and 14.7 g of a polystyrene-based anion exchange resin (product name: Diaion SA10A, manufactured by Mitsubishi Chemical Corporation, moisture content: 43 to 47% by mass) were placed in a flask, and the resulting mixture was reacted by stirring for 72 hours at room temperature. Following completion of this 72 hour reaction, 24 g of xylene was added, and the mixture was filtered, yielding 124 g of a solution (that included some organic solvent and had a non-volatile fraction of 57% by mass) of an organopolysiloxane F with a polystyrene equivalent weight average molecular weight of 280,000, represented by a formula (9) shown below:

$$(CH_3)_{1.0}(OX)_{0.12}SiO_{1.44} \tag{9}$$

(wherein, X represents a combination in which the ratio (molar ratio) hydrogen atoms:methyl groups:isobutyl groups=5.3:1.1:0.9).

Comparative Example 1

A 1 L three-neck flask was fitted with a stirrer and a condenser tube. The flask was then charged with 40.9 g (0.3 mols) of methyltrimethoxysilane, 84.1 g (0.7 mols) of dimethyldimethoxysilane, and 113 g of isobutyl alcohol, and the mixture was cooled in ice with constant stirring. With the temperature inside system maintained at 0 to 20° C., 52 g of 0.05 N hydrochloric acid solution was added dropwise. Following completion of the dropwise addition, the reaction mixture was stirred for 11 hours at a reflux temperature of 80° C. Subsequently, the resulting reaction solution was cooled to room temperature, and 150 g of xylene was added to dilute the reaction solution. This diluted reaction solution was then poured into a separating funnel, and washed repeatedly with 300 g samples of water until the electrical conductivity of the separated wash water fell to no more than 2.0 μS/cm. The water was then removed from the washed reaction solution by azeotropic dehydration, and the volatile fraction was adjusted to 30% by mass, thereby yielding 108 g of a solution (that included some organic solvent and had a non-volatile fraction of 70% by mass) of an organopolysiloxane G with a polystyrene equivalent weight average molecular weight of 8,600, represented by a formula (10) shown below:

$$(CH_3)_{1.7}(OX)_{0.25}SiO_{1.03} \quad (10)$$

(wherein, X represents a combination in which the ratio (molar ratio) hydrogen atoms:methyl groups:isobutyl groups=6.1:1.1:1.1).

Subsequently, the 108 g of the solution of the obtained organopolysiloxane G (that included some organic solvent and had a non-volatile fraction of 70% by mass) and 15.1 g of a polystyrene-based anion exchange resin (product name: Diaion SA10A, manufactured by Mitsubishi Chemical Corporation, moisture content: 43 to 47% by mass) were placed in a flask, and the resulting mixture was reacted by stirring for 72 hours at room temperature. Following completion of this 72 hour reaction, 25 g of xylene was added, and the mixture was filtered, yielding 129 g of a solution (that included some organic solvent and had a non-volatile fraction of 57% by mass) of an organopolysiloxane H with a polystyrene equivalent weight average molecular weight of 23,000, represented by a formula (11) shown below:

$$(CH_3)_{1.7}(OX)0.22SiO1.04 \quad (11)$$

(wherein, X represents a combination in which the ratio (molar ratio) hydrogen atoms:methyl groups:isobutyl groups=6.2:1.0:1.2).

Examples 4 to 6, Comparative Examples 2 to 4

The organopolysiloxanes produced in the above examples 1 through 3 and the comparative example 1 were combined with the condensation catalyst zinc octoate, using the compounds and blend quantities shown in Table 1. The resulting compositions were then cured in accordance with the evaluation methods described below, and the resulting cured products (coatings) were evaluated for crack resistance, adhesion, heat resistance, and external appearance. The results obtained are shown in Table 1.

-Evaluation Methods-

1. Crack Resistance

The composition was placed in an LED package, subsequently subjected to sequential step curing at room temperature for 1 hour, 60° C. for 30 minutes, 80° C. for 30 minutes and 150° C. for 1 hour, and was then subjected to post curing at 150° C. for 7 hours, thus yielding a cured film with a thickness of 20 μm. This cured film was inspected visually for the presence of cracks. If no cracks were visible, the crack resistance was evaluated as good, and was recorded in Table 1 as "good". If cracks were detected, then the crack resistance was evaluated as poor, and was recorded in Table 1 as "cracks".

2. Adhesion

The composition was applied to a glass substrate using an immersion method, subsequently subjected to sequential step curing at room temperature for 1 hour, 60° C. for 30 minutes, 80° C. for 30 minutes and 150° C. for 1 hour, and was then subjected to post curing at 150° C. for 7 hours, thus curing the composition on top of the glass substrate. The adhesion between the thus obtained cured product and the glass substrate was evaluated using a cross-cut adhesion test.

3. Heat Resistance

The composition was placed in a Teflon (registered trademark) coated mold of dimensions length: 10 mm×width: 10 mm×depth: 300 μm, subsequently subjected to sequential step curing at room temperature for 1 hour, 60° C. for 30 minutes, 80° C. for 30 minutes and 150° C. for 1 hour, and was then subjected to post curing at 150° C. for 7 hours, thus yielding a cured film of thickness 200 μm, the mass of which was measured. This cured film was then placed in an oven at 250° C., and the mass was re-measured after 500 hours in the oven. The ratio of the mass of the cured film following 500 hours in the oven relative to the mass of the cured film immediately following preparation was determined and reported as a residual mass ratio (%). The heat resistance was evaluated as being more favorable the closer this value was to 100%.

4. External Appearance of Cured Product

The composition was placed in a Teflon (registered trademark) coated mold of dimensions length: 50 mm×width: 50 mm×depth: 300 μm, subsequently subjected to sequential step curing at room temperature for 1 hour, 60° C. for 30 minutes, 80° C. for 30 minutes and 150° C. for 1 hour, and was then subjected to post curing at 150° C. for 7 hours, thus yielding a cured film of thickness 200 μm. The surface of this cured film was inspected visually. If cracks were noticeable, then the surface of the non-cracked portions was evaluated.

TABLE 1

|  | Examples | | | Comparative Examples | | |
|---|---|---|---|---|---|---|
|  | 4 | 5 | 6 | 2 | 3 | 4 |
| Organopolysiloxane B | 10 | — | — | — | — | — |
| Organopolysiloxane D | — | 10 | — | — | — | — |

TABLE 1-continued

|  | Examples | | | Comparative Examples | | |
| --- | --- | --- | --- | --- | --- | --- |
|  | 4 | 5 | 6 | 2 | 3 | 4 |
| Organopolysiloxane F | — | — | 10 | — | — | — |
| Organopolysiloxane A | — | — | — | 8.1 | — | — |
| Organopolysiloxane C | — | — | — | — | 8.1 | — |
| Organopolysiloxane H | — | — | — | — | — | 10 |
| Zinc octoate | 0.05 | 0.05 | 0.05 | 0.05 | 0.05 | 0.05 |
| *1 methyl group content (% by mass) | 26.3 | 31.9 | 22.3 | 26.3 | 31.9 | 35.5 |
| Weight average molecular weight | 210,000 | 80,000 | 280,000 | 24,000 | 9,000 | 23,000 |
| Crack resistance | Good | Good | Good | Cracks | Cracks | Cracks |
| Adhesion | 100/100 | 100/100 | 100/100 | 60/100 | 30/100 | *3 not measurable |
| Heat resistance [residual mass ratio (% by mass)] | 96 | 87 | 98 | 94 | 84 | *2 not measurable |
| Cured product external appearance | colorless, transparent | colorless, transparent | colorless, transparent | colorless, transparent | colorless, transparent | colorless, transparent |

(units: parts by mass)
*The blend quantities of the organopolysiloxanes shown in the table are quantities for the non-volatile fraction and do not include the organic solvent.
*1 Methyl group content: the theoretical quantity of methyl groups within the organopolysiloxane (non-volatile fraction) containing no organic solvent.
*2 Not measurable: a cured film of thickness 200 μm could not be prepared, so the residual mass ratio could not be measured.
*3 Not measurable: the presence of cracking made the measurement of adhesion impossible.

What is claimed is:

1. A method of producing a high molecular weight organopolysiloxane with a polystyrene equivalent weight average molecular weight of at least $5 \times 10^4$, represented by an average composition formula (1) shown below:

$$R^1_a(OX)_b SiO_{(4-a-b)/2} \tag{1}$$

(wherein, each $R^1$ represents, independently, an alkyl group, alkenyl group or aryl group of 1 to 6 carbon atoms, each X represents, independently, a hydrogen atom, or an alkyl group, alkenyl group, alkoxyalkyl group or acyl group of 1 to 6 carbon atoms, a represents a number within a range from 1.00 to 1.5, and b represents a number that satisfies 0<b<2, provided that a+b satisfies 1.00<a+b <2),
comprising the steps of producing an organopolysiloxane by subjecting a silane compound having a hydrolyzable group to a first hydrolysis and condensation, and subjecting said organopolysiloxane to an additional second hydrolysis and condensation.

2. The method according to claim 1, wherein said silane compound having a hydrolyzable group comprises at least 50 mol % of a silane compound containing 3 hydrolyzable groups within each molecule.

3. The method according to claim 2, wherein said silane compound containing 3 hydrolyzable groups within each molecule is an organotrialkoxysilane.

4. The method according to claim 1, wherein said silane compound having a hydrolyzable group comprises from 50 to 100 mol % of an organotrialkoxysilane and from 50 to 0 mol % of a diorganodialkoxysilane.

5. The method according to claim 1, wherein said first hydrolysis and condensation is conducted in presence of an acid catalyst.

6. The method according to claim 5, wherein said acid catalyst is acetic acid, hydrochloric acid or sulfuric acid or a combination thereof.

7. The method according to claim 1, wherein said second hydrolysis and condensation is conducted in presence of an anion exchange resin.

8. The method according to claim 7, wherein said anion exchange resin is a polystyrene-based anion exchange resin.

9. The method according to claim 8, wherein said polystyrene-based anion exchange resin has a molecular structure represented by a structural formula (3) shown below:

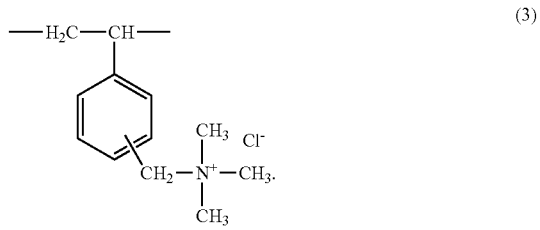

(3)

* * * * *

UNITED STATES PATENT AND TRADEMARK OFFICE
CERTIFICATE OF CORRECTION

PATENT NO. : 7,563,854 B2
APPLICATION NO. : 11/586525
DATED : July 21, 2009
INVENTOR(S) : Shimizu et al.

Page 1 of 1

It is certified that error appears in the above-identified patent and that said Letters Patent is hereby corrected as shown below:

On the title page, Item (73), Assignee should read:

-- (73) Assignee: Shin-Etsu Chemical Co., Ltd., Tokyo (JP) --

Signed and Sealed this

First Day of September, 2009

David J. Kappos
*Director of the United States Patent and Trademark Office*